United States Patent
Jerrim et al.

(10) Patent No.: US 10,260,277 B2
(45) Date of Patent: *Apr. 16, 2019

(54) ENCAPSULATED GLASS FRAME ASSEMBLIES AND ASSOCIATED METHODS FOR FORMING SAME

(71) Applicants: AGC Automotive Americas R&D, Inc., Ypsilanti, MI (US); AGC Flat Glass North America, Inc., Alpharetta, GA (US)

(72) Inventors: Joel Jerrim, White Lake, MI (US); Daniel Bennett, Tecumseh, MI (US); David W. Lahnala, Adrian, MI (US)

(73) Assignees: AGC AUTOMOTIVE AMERICAS R&D, INC., Ypsilanti, MI (US); AGC FLAT GLASS NORTH AMERICA, INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/486,490

(22) Filed: Apr. 13, 2017

(65) Prior Publication Data

US 2018/0119479 A1    May 3, 2018

Related U.S. Application Data

(60) Provisional application No. 62/415,823, filed on Nov. 1, 2016.

(51) Int. Cl.
*E06B 1/26*    (2006.01)
*B60J 1/00*    (2006.01)
(Continued)

(52) U.S. Cl.
CPC .... *E06B 3/67356* (2013.01); *B29C 45/14434* (2013.01); *B29C 70/763* (2013.01);
(Continued)

(58) Field of Classification Search
CPC . B60J 1/001; B60J 1/004; B60J 1/006; B26K 2105/20; B29K 2709/08;
(Continued)

(56) References Cited

U.S. PATENT DOCUMENTS 2,587,354 A    2/1952 Mauck
2,606,059 A    8/1952 Wernig
(Continued)

FOREIGN PATENT DOCUMENTS

DE    3203580 A1    9/1983
DE    3932724 A1    4/1991
(Continued)

OTHER PUBLICATIONS

English language abstract not found for FR 799 711; however, see English language equivalent GB 458 974. Original document extracted from espacenet.com database on Apr. 5, 2018, 4 pages.
(Continued)

*Primary Examiner* — Charles A Fox
*Assistant Examiner* — James Buckle, Jr.
(74) *Attorney, Agent, or Firm* — Howard & Howard Attorneys PLLC

(57) ABSTRACT

An encapsulated glass assembly includes a plastic frame having at least three sides and corners, with the frame having a channel extending within its outer frame surface that includes a lower wall portion connected to a side wall portion. The outer frame surface further includes at least one upper wall portion extending from the side wall portion and extending along at least one side of the frame, each one of the at least one upper wall portions further defining a portion of the channel as a C-shaped channel. A glass panel coupled to the frame is retained within the C-shaped channel along at least one side of the frame such that the edge of the panel is adjacent to the side wall portion. An encapsulant having (Continued)

a Shore hardness less than the frame is bonded onto the panel and onto the frame to secure the panel to the frame.

21 Claims, 9 Drawing Sheets

(51) Int. Cl.

| | | |
|---|---|---|
| *E06B 3/673* | (2006.01) | |
| *B60J 10/70* | (2016.01) | |
| *B29C 70/76* | (2006.01) | |
| *E06B 3/54* | (2006.01) | |
| *E06B 3/64* | (2006.01) | |
| *E06B 3/66* | (2006.01) | |
| *B29C 45/14* | (2006.01) | |
| *B32B 17/10* | (2006.01) | |
| *B60J 1/10* | (2006.01) | |
| *B60J 10/20* | (2016.01) | |
| *B29K 105/20* | (2006.01) | |
| *B29K 709/08* | (2006.01) | |
| *B29L 31/00* | (2006.01) | |
| *B29L 31/30* | (2006.01) | |

(52) U.S. Cl.
CPC ......... *B32B 17/10302* (2013.01); *B60J 1/001* (2013.01); *B60J 1/004* (2013.01); *B60J 1/006* (2013.01); *B60J 1/10* (2013.01); *B60J 10/20* (2016.02); *B60J 10/70* (2016.02); *E06B 3/5454* (2013.01); *E06B 3/645* (2013.01); *E06B 3/6625* (2013.01); *B29K 2105/20* (2013.01); *B29K 2709/08* (2013.01); *B29L 2031/006* (2013.01); *B29L 2031/3052* (2013.01)

(58) Field of Classification Search
CPC ............ B26C 70/763; B26L 2031/006; B26L 2031/3052; E06B 3/5454; E06B 3/645; E06B 3/6625; E06B 3/67356
See application file for complete search history.

(56) References Cited

U.S. PATENT DOCUMENTS

| | | |
|---|---|---|
| 2,723,427 A | 11/1955 | Bobel |
| 3,274,740 A | 9/1966 | Hall |
| 3,388,698 A | 6/1968 | Satkunas |
| 4,524,978 A | 6/1985 | Mauser |
| 4,671,013 A | 6/1987 | Friese et al. |
| 4,947,606 A | 8/1990 | La See |
| 5,617,695 A | 4/1997 | Brimmer |
| 5,628,155 A | 5/1997 | Nolte et al. |
| 5,713,167 A | 2/1998 | Durham et al. |
| 5,944,324 A | 8/1999 | Schultheis et al. |
| 5,997,793 A | 12/1999 | Lahnala |
| 6,223,470 B1 | 5/2001 | Millard et al. |
| 6,409,251 B1 | 6/2002 | Kaye et al. |
| 6,766,617 B2 | 7/2004 | Purcell |
| 7,219,470 B2 | 5/2007 | Lahnala |
| 7,395,631 B2 | 7/2008 | Lahnala |
| 7,934,342 B2 | 5/2011 | Lahnala |
| 8,127,498 B2 | 3/2012 | Lahnala |
| 8,322,075 B2 | 12/2012 | Lahnala |
| 8,388,043 B2 | 3/2013 | Lahnala |
| 8,595,981 B2 | 12/2013 | Lahnala |
| 8,844,203 B2 | 9/2014 | Lahnala |
| 9,126,474 B2 | 9/2015 | Cicala |
| 9,211,780 B2 | 12/2015 | Lahnala |
| 9,463,684 B2 | 10/2016 | Lahnala |
| 9,878,599 B2 | 1/2018 | Lahnala |
| 9,920,566 B1 | 3/2018 | Bennett et al. |
| 2010/0122495 A1 | 5/2010 | Lahnala |
| 2011/0214717 A1 | 9/2011 | Halahmi et al. |
| 2012/0139289 A1 | 6/2012 | Lahnala |
| 2013/0185973 A1 | 7/2013 | Scheyer et al. |
| 2014/0165343 A1 | 6/2014 | Gibbs et al. |
| 2014/0230333 A1 | 8/2014 | Lahnala |

FOREIGN PATENT DOCUMENTS

| | | |
|---|---|---|
| DE | 4008702 A1 | 9/1991 |
| EP | 0076924 A2 | 4/1983 |
| FR | 799711 A | 6/1936 |
| FR | 2970756 A1 | 7/2012 |
| GB | 458974 A | 12/1936 |
| GB | 484765 A | 5/1938 |

OTHER PUBLICATIONS

English language abstract and machine-assisted English translation for DE 32 03 580 extracted from espacenet.com database on Nov. 6, 2017, 9 pages.

English language abstract and machine-assisted English translation for DE 39 32 724 extracted from espacenet.com database on Nov. 6, 2017, 6 pages.

English language abstract and machine-assisted English translation for DE 40 08 702 extracted from espacenet.com database on Nov. 6, 2017, 9 pages.

English language abstract and machine-assisted English translation for EP 0 076 924 extracted from espacenet.com database on Nov. 6, 2017, 12 pages.

English language abstract and machine-assisted English translation for FR 2 970 756 extracted from espacenet.com database on Nov. 6, 2017, 9 pages.

Hexpol Group, "Dryflex, Mediprene, Lifoflex—TPE Processing Guide", downloaded from http://www.hexpoltpe.com/getfile.php?type=site_documents&id=tpe-processing-guide.pdf in May 2016, pp. 1-10.

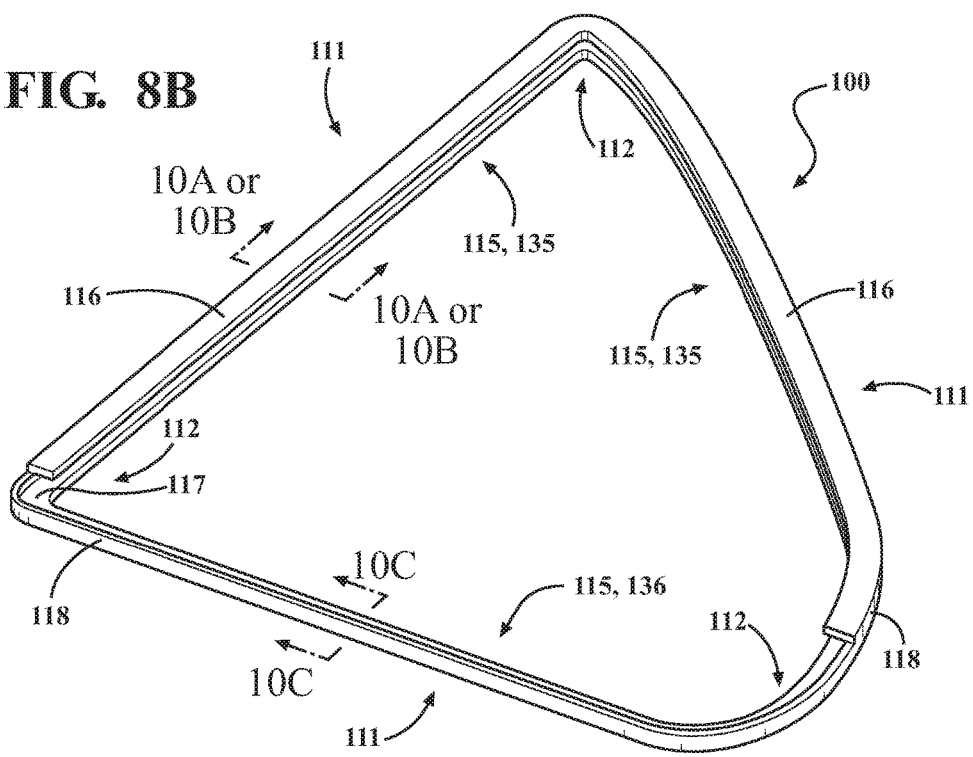

ENCAPSULATED GLASS FRAME ASSEMBLIES AND ASSOCIATED METHODS FOR FORMING SAME

CROSS-REFERENCE TO RELATED APPLICATIONS

This application claims priority to and all advantages of U.S. Provisional Application No. 62/415,823, filed on Nov. 1, 2016, the content of which is incorporated by reference.

BACKGROUND OF THE INVENTION

1. Field of the Invention

The subject invention generally relates to encapsulated glass frame assemblies and associated methods for forming encapsulated glass frame assemblies.

2. Description of the Related Art

Polymeric encapsulants for encapsulated glass frame assemblies (sometimes referred to as window assemblies), such as those used on vehicles, are generally known in the art. Generally, these encapsulated glass frame assemblies include a transparent pane, commonly made from glass (i.e., a glass panel). The polymeric encapsulant is bonded to the perimeter of the glass panel to form a frame for the glass panel. The polymeric encapsulant can be bonded to one, two, or three surfaces of the transparent pane.

The polymeric encapsulants can be formed from either a thermosetting material or a thermoplastic encapsulating material. Exemplary thermosetting encapsulating materials include, for example, a reaction injection molded (RIM) material, while exemplary thermoplastic encapsulating materials include, for example, polypropylene (PP), polyvinylchloride (PVC) or thermoplastic elastomers (TPEs). Non-limiting examples of TPE elastomers that can be used as the encapsulating material include SBS (poly(styrene-butadiene-styrene), also alternatively referred to as a styrene-butadiene-styrene block copolymer) and SEBS (styrene-ethylene-butylene-styrene block copolymers).

In certain applications, the polymeric encapsulant is applied in a single application step, and therein forms a one-shot encapsulant. In other applications, the polymeric encapsulant is applied in two separate applications steps with two separate polymeric materials, and therein forms a two-shot encapsulant having a first encapsulation layer and a second encapsulation layer such that the first encapsulation layer is between the transparent pane and the second encapsulation layer.

While such encapsulated glass frame assemblies including one-shot or two-shot encapsulants are generally suitable for their intended purpose, these encapsulated glass frame assemblies do suffer from a variety of known deficiencies related to bonding strength and structural rigidity of the formed encapsulants functioning as frames for the glass panels.

For example, certain encapsulating materials, such as TPE, bond well to the glass (with the use of adhesion promoters) and therefore prevent water from migrating between the applied encapsulant and the glass. TPE-based encapsulants also provide good sealing to the vehicle body because it is softer. However, because the TPE-based encapsulants are softer, they do not provide structural rigidity that allows the TPE-based encapsulants to fix the glass strongly to the vehicle.

Conversely, other encapsulating materials, such as polypropylene, form encapsulants providing enhanced structural rigidity relative to TPE-based encapsulants, and therefore can fix the glass strongly to the vehicle. However, polypropylene does not bond well to the glass itself, and therefore polypropylene-based encapsulants do not provide good sealing between the applied encapsulant and glass to prevent water from migrating between the polypropylene encapsulant and glass. Still further, in one example that is representative of general formation conditions for forming encapsulated glass frame assemblies with these other encapsulating materials providing the desired structural rigidity, polypropylene-based encapsulants require the use of an injection molding process to apply the polypropylene to the glass that requires both high barrel temperatures (ranging generally from about 400 to 450 degrees Fahrenheit (about 200 to 235 degrees Celsius)) and high injection pressures (ranging generally from about 6600 to 7250 pounds per square inch (about 4.62 to 5.20 MPa (MegaPascals))). with these temperatures and pressures being application dependent. Such high temperatures and pressures can result in the breakage of the glass panel during the injection molding process, particularly when the glass panel is a laminated glass panel.

The present invention addresses many of the deficiencies found in such encapsulated glass frame assemblies.

SUMMARY OF THE INVENTION AND ADVANTAGES

The invention provides encapsulated glass frame assemblies having as its major components a glass panel, a plastic frame, and an encapsulant.

In certain embodiments, the encapsulated glass assembly comprises a glass panel having a first side and a second side and an edge between the first side and the second side and a plastic frame coupled to the glass panel. The plastic frame has at least three sides and has a corner located between each adjacent side. The plastic frame also includes an outer frame surface, with the outer frame surface including a channel extending within the outer frame surface, wherein the channel has a lower wall portion connected to a side wall portion. The outer frame surface further includes at least one upper wall portion extending from the side wall portion and extending along at least one side of the at least three sides of the plastic frame, each one of the at least one upper wall portions further defining a portion of the channel as a C-shaped channel. The glass panel is coupled to the plastic frame such that the glass panel is retained within the C-shaped channel and such that the edge of the glass panel is adjacent to the side wall portion along each of the at least three sides and corners of the plastic frame. An encapsulant is bonded to at least one of the first side and the second side of the glass panel and is bonded onto the outer frame surface of the plastic frame to secure the glass panel to the plastic frame. The encapsulant has a Shore hardness less than a Shore hardness of the plastic frame (i.e., the encapsulant is softer than the plastic frame).

In certain of these embodiments, the glass panel is a laminated glass panel, while in other embodiments the glass panel is a tempered glass panel.

The present invention also provides a method for forming the encapsulated glass assemblies having the features described above.

The present invention thus provides simplified encapsulated glass assemblies having high strength and a simplified manufacturing process. In addition, the coupling of the plastic frame in accordance with the present invention forms encapsulated glass assemblies with high strength that cannot be reliably achieved using the one-shot or two-shot encapsulation techniques as described above. Still further, the application of the encapsulant onto the glass panel and frame to secure the glass panel to the frame in accordance with the present invention may be done at lower temperatures and pressures than required to bond high hardness plastic materials such as polypropylene to the glass panel, thus minimizing or preventing the breakage of the glass panels during the application process. Accordingly, the present invention allows the use of lower strength and better acoustical glass panels, such as laminated glass panels, in this manufacturing process. Still further, the encapsulant also provides a sealing and strong bond between the encapsulant and the glass panel, thus prevent minimizing or preventing water or other liquids from migrating between the applied encapsulant and glass panel prior to use or during use wherein the glass assembly is installed within a vehicle.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 8B is a perspective view of a plastic frame for use in the encapsulated glass assembly in accordance with yet another embodiment of the present invention;

DETAILED DESCRIPTION OF THE INVENTION

Referring to the Figures, wherein like numerals indicate corresponding parts throughout the several views, the present invention is directed to an encapsulated glass assembly 25 that may be used in a variety of applications. As illustrated herein, the encapsulated glass assembly 25 is included in a vehicle, such as an automobile.

Figure 1:
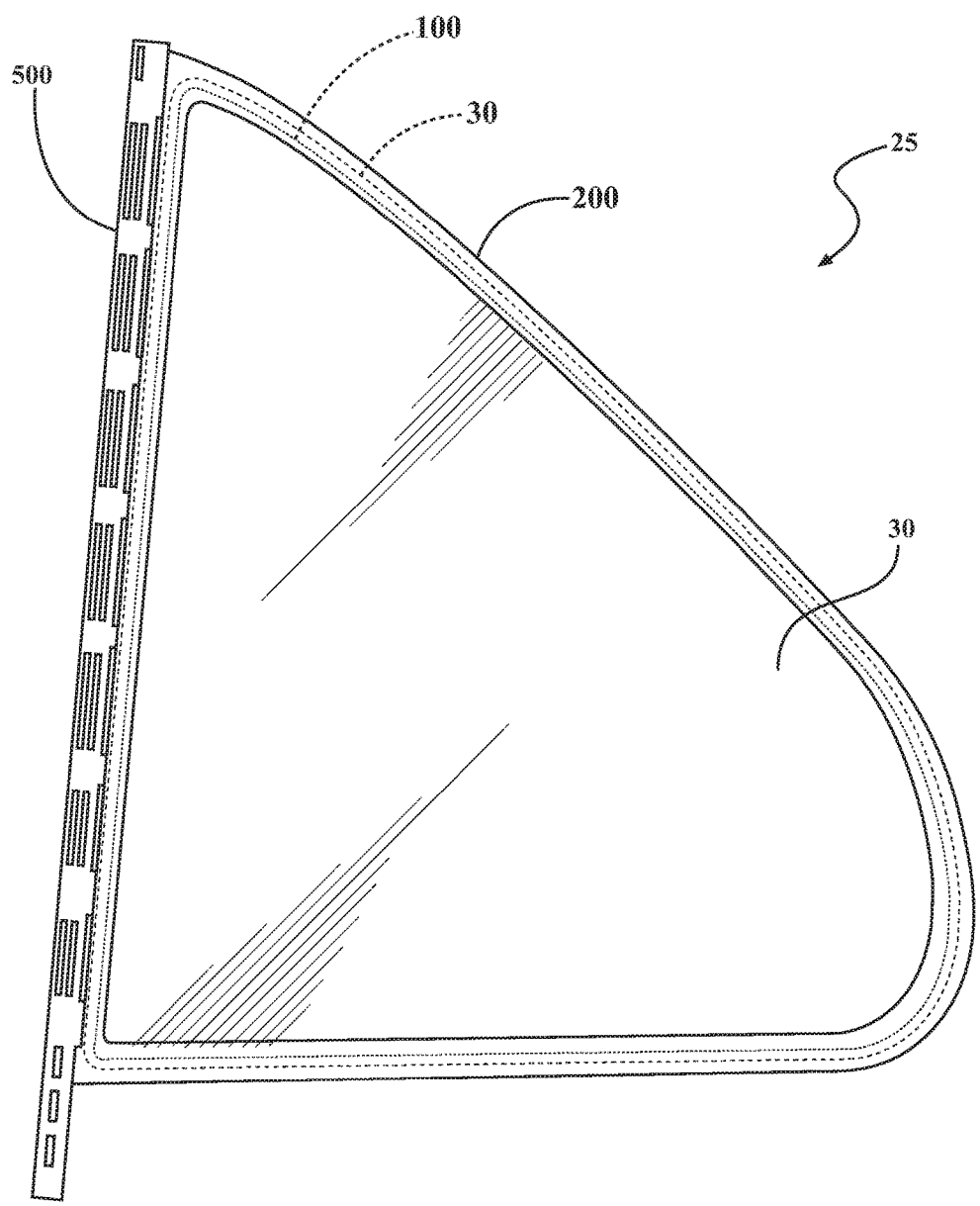
FIG. 1 is a perspective view of an encapsulated glass assembly in accordance with one embodiment of the present invention.

Referring now to FIG. 1, the encapsulated glass assembly 25 includes, as its major components, a glass panel 30 coupled to a plastic frame 100. In addition, the encapsulated glass assembly 25 includes an encapsulant 200 that bonds to both the glass panel 30 and frame 100 and thus functions to secure the plastic frame 100 to the glass panel 30. Accordingly, the encapsulant 200 effectively functions as a second frame and may be alternatively referred to herein as a second frame.

As also shown in FIG. 1, the encapsulated glass assembly 25 may be coupled to, attached to, or is otherwise secured to a support frame 500. Alternatively, the support frame 500 may be integral with the plastic frame 100 (i.e., the support frame 500 and frame 100 are formed as a single component and not two separate components). The support frame 500 is contained within the vehicle (not shown), and thus the encapsulated glass assembly 25 may function as a window for the vehicle. In certain embodiment, the encapsulated glass assembly 25 is a side window coupled to the A-pillar of the vehicle adjacent to the driver's side or passenger side window, while in other embodiments the glass assembly is a side window that is coupled to the C-pillar of the vehicle adjacent to the rear passenger side windows. In still further embodiments, the encapsulated glass assembly 25 may be included as a side portion of the front windshield.

Figure 2:
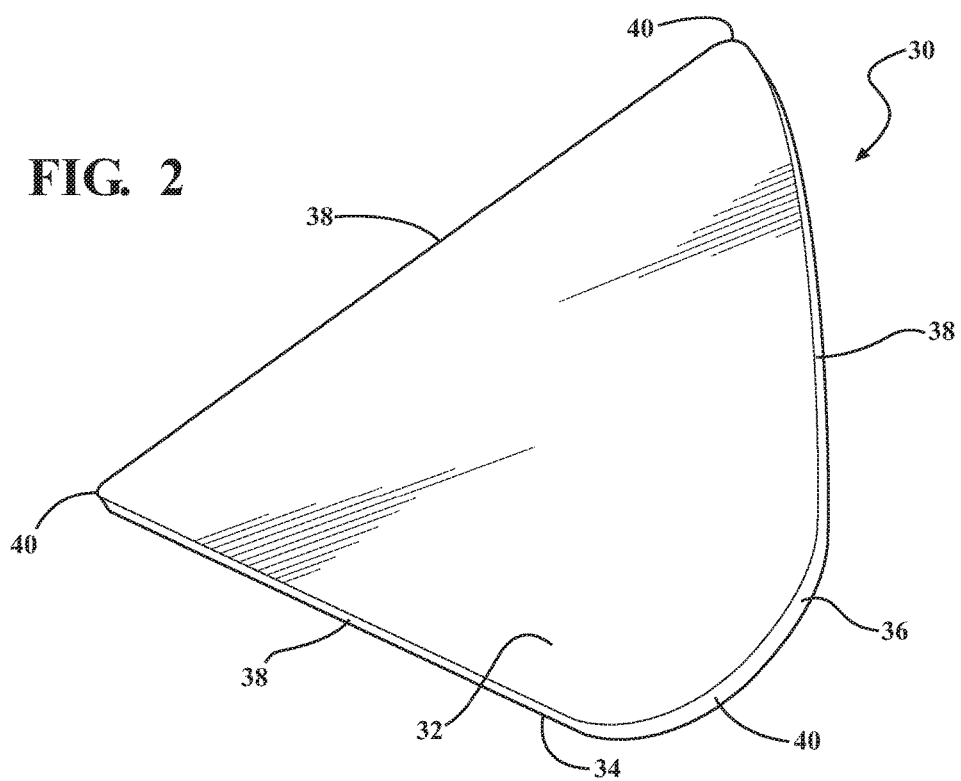
FIG. 2 is a perspective view of the glass panel of FIG. 1.

Referring to FIG. 2, the glass panel 30 includes, in general, a first side 32 and a second side 34 and an edge 36 between the first side 32 and the second side 34. Typically, when the glass panel 30 is installed within the vehicle (not shown), one side (i.e., one of the first side 32 or the second side 34) of the glass panel 30 is positioned towards the passenger compartment of the vehicle, and thus may define a portion of the passenger compartment, while the other side (i.e., the other one of the first side 32 or the second side 34) is positioned outwardly from the vehicle and away from the passenger compartment.

The glass panel 30 may be formed in any shape depending upon its use. Thus, for example, the glass panel 30 may be formed having at least three sides 38 defined along the edge 36. In these embodiments, each adjacent pair of the sides 38 may be connected by transition regions, or corners 40 (i.e., wherein the sides 38 and corners 40 collectively define the shape of the glass panel 30). Accordingly, in embodiments having three sides 38, such as when used as the side windows coupled to either the A-pillar or C-pillar of the vehicle through the support frame 500 as described above, the glass panel 30 may be triangular shaped. Still further, in embodiments have four sides 38 and four corners 40, the glass panel 30 may have a generally square or rectangular shape or may have another quadrilateral shape that does not generally define a square or rectangle. In these embodiments, the corners 40 may form abrupt transitions between sides 38 or may be generally rounded between the sides 38. In still further embodiments, the segment of the plastic frame 100 corresponding to one of the sides 38 may be straight along its length (as in a triangle or square), may be rounded, or may take on any other respective shape along the length of the side 38. Still further, in other embodiments, the transitions along the corners 40 may be slightly rounded or perfectly rounded, (i.e., less or not abrupt). In these embodiments, the sides 38 may correspond in roundness to the corners, and thus form round or oval parts to correspond to the round or oval shape of the glass panel 108. Thus, for example, wherein the glass panel 30 is round or oval, the sides 38 correspond to segments of a round or oval shaped plastic frame 100, and the corners 40 represent round or oval transitional segments between the respective round or oval segments. For illustrative purposes, the glass panel 30 in the embodiments illustrated herein have a triangular shape including three sides 38 and three corresponding corners 40, with one corner 40 positioned between each pair of adjacent sides 38.

Figure 3:
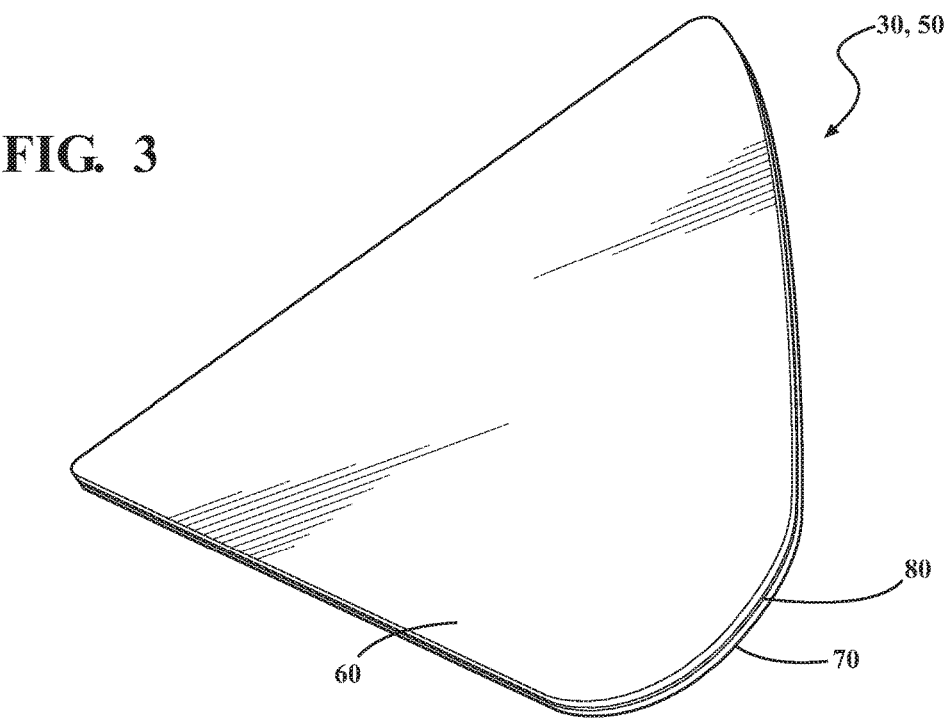
FIG. 3 is a perspective view of a laminated glass panel for use in the glass assembly of one embodiment of the present invention.

In certain embodiments, the glass panel 30 is in the form of a laminated window assembly 50. As shown best in FIGS. 3 and 4, the laminated glass panel 50 includes an inner transparent sheet 60 and an outer transparent sheet 70 and an interlayer 80 disposed between the inner transparent sheet 50 and the outer transparent sheet 70.

In certain embodiments, the inner and outer transparent sheets 60, 70 are panes of glass that are substantially transparent. However, in other embodiments, the inner and outer transparent sheets 60, 70 may be plastic, fiberglass, or any other suitable substantially transparent material. As defined herein, the term "substantially transparent", as used with respect to the transparent sheets 60 and 70, refers to a material that allows 70% or more of light transmission in a predefined wavelength range, such as the visible light range. The panes of glass are preferably automotive glass and, more specifically, soda-lime-silica glass. However, in other embodiments, the inner and outer transparent sheets 60, 70 may be plastic, fiberglass, or other suitable substantially transparent material.

In other embodiments, the inner and outer transparent sheets 60, 70 are panes of glass that are less transparent. For example, wherein the glass assembly is a privacy glass, the transparency of the glass is substantially reduced, and thus allows less than 70% light transmission in a predefined wavelength range, such as from greater than 0 to 70% light transmission at the predefined wavelength range. As used hereinafter, the term transparent, as it relates to the transparent sheets 60 or 70 or interlayer 80 of the present invention, or more generally as it relates to the glass panel 30, refers to a sheet or panel having at least some degree of transparency at the predefined wavelength range and is not intended to be limited to substantial transparent as defined in the previous paragraph.

Figure 4:
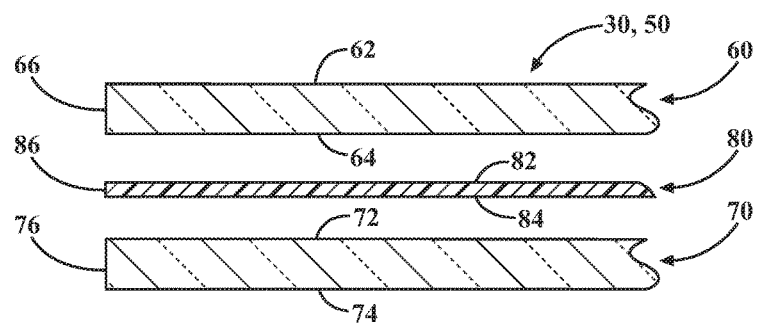
FIG. 4 is a side exploded view of FIG. 2.

As best shown in FIG. 4, the inner transparent sheet 60 includes a first side 62 and a second side 64 and an edge 66 defined between the first and second sides 62, 64. Similarly, the outer transparent sheet 70 includes a first side 72 and a second side 74 and an edge 76 defined between the first and second sides 72, 74.

As noted above, the laminated glass panel 50 also includes an interlayer 80 disposed between the inner and outer transparent sheets 60, 70. Preferably, the interlayer 80 bonds the inner and outer transparent sheets 60, 70 and allows the laminated glass panel 50 to retain glass panels piece upon impact or breakage.

The interlayer 80 typically is substantially transparent to light and includes a polymer or thermoplastic resin, such as polyvinyl butyral (PVB). However, other suitable materials for implementing the interlayer 80 may be utilized. Similar to the inner and outer transparent sheets 60, 70, the interlayer 80 is also substantially transparent or otherwise transparent to light, and accordingly the glass panel 50 assembled to include the interlayer 80 between the inner and outer transparent sheets 60, 70 is also substantially transparent or otherwise transparent to light. The interlayer 80 includes a first side 82 and a second side 84 and an edge 86 defined between the first and second sides 82, 84.

When assembled, the first side 82 of the interlayer 80 bonds to the second side 64 of the inner transparent sheet 60, and a second side 84 of the interlayer 80 bonds to a first side 72 of the second transparent sheet 70 such that the interlayer 80 bonds to each of the inner and outer transparent sheets 60, 70 to form the laminated glass panel 50.

When assembled, the relative thickness of each of the edges 66, 76, 86 of the laminated glass panel 50 corresponds to the edge 36 of the glass panel 30. In addition, the first surface 62 and the second surface 74 correspond to the first side 32 and second side 34, respectively, of the glass panel 30.

Figure 5:
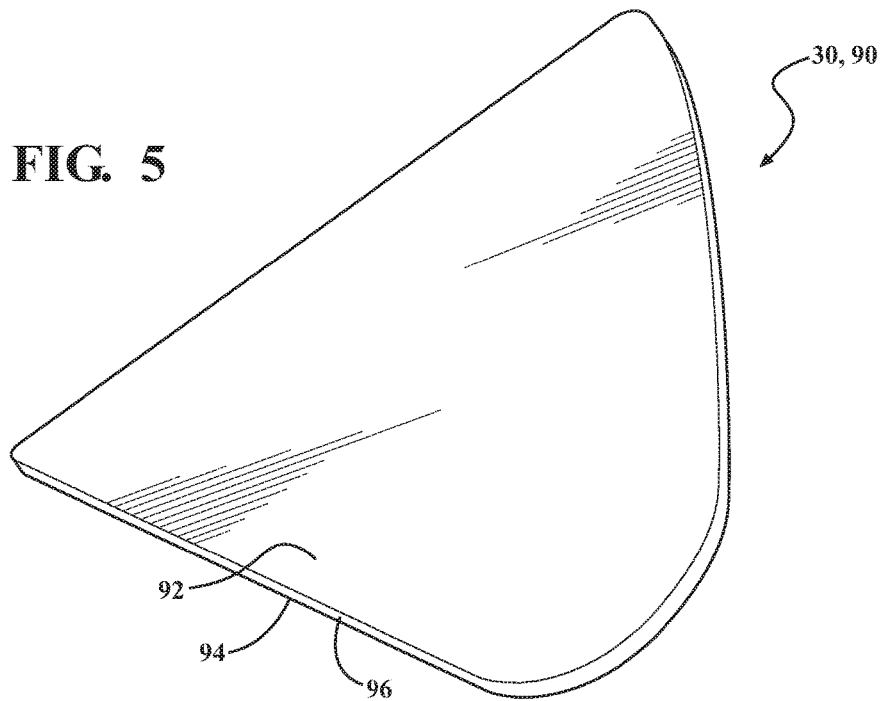
FIG. 5 is a perspective view of a tempered glass panel for use in the encapsulated glass assembly of another embodiment of the present invention.

As noted above, in another embodiment, the glass panel 30 is a tempered glass panel 90. As opposed to a laminated glass panel 50, a tempered glass panel 90 is a single layer glass panel that has been processed by controlled thermal or chemical treatments to increase its strength compared to normal glass (i.e., untempered or annealed glass). Accordingly, the tempered glass panel 90, as shown in FIG. 5, includes a first side 92 (which corresponds to the first side 32), a second side 94 (which corresponds to the second side 34), and an edge 96 (which corresponds to the edge 36) defined between the first and second sides 92, 94.

Figure 6:
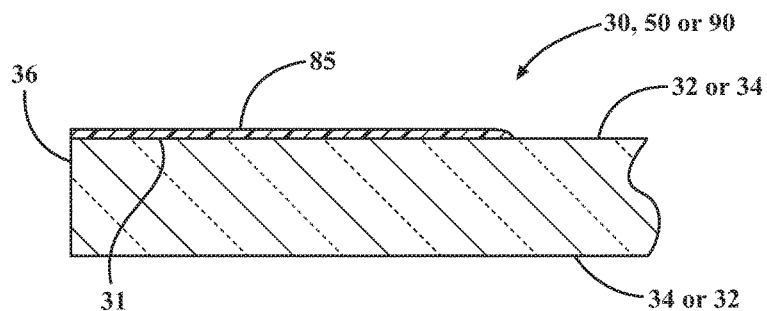
FIG. 6 is a side view of FIG. 2, 3 or 5 including a primer disposed on a portion of one side of the glass panel in accordance with another embodiment of the present invention.
Figure 7:
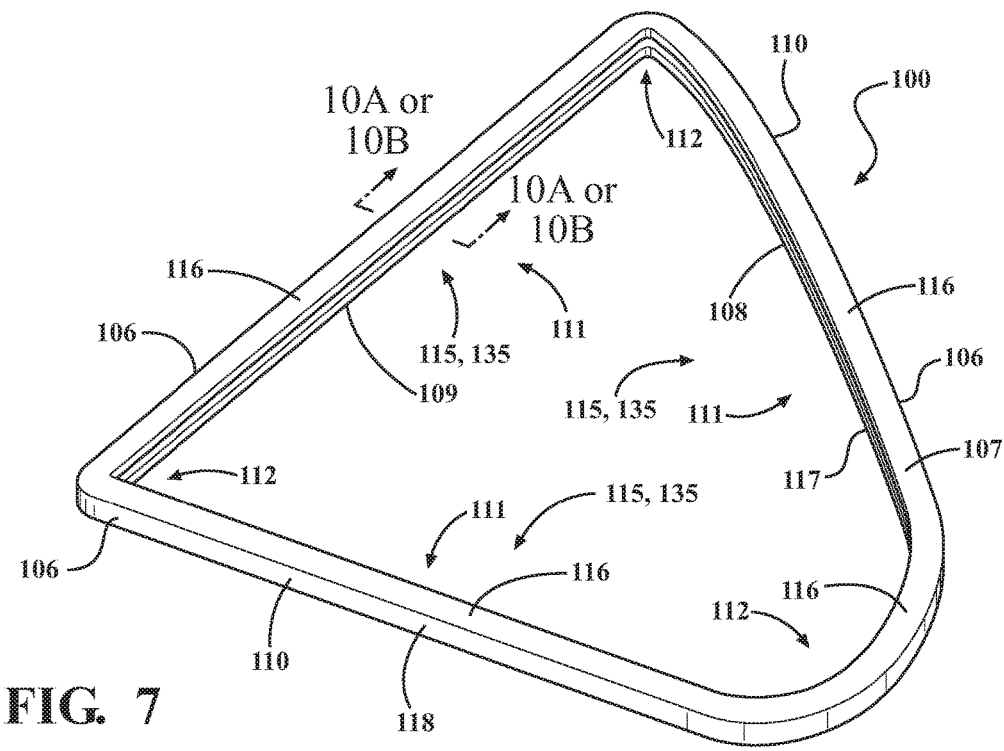
FIG. 7 is a perspective view of a plastic frame for use in the encapsulated glass assembly in accordance with one embodiment of the present invention.

In still further embodiments, such as illustrated in FIG. 6, the glass panel 30 of any of the embodiments described above may also include a primer 85 that is applied onto a portion of the first side 32, second side 34 and/or the edge 36 of the glass panel 30 (as shown in FIG. 7, the primer 85 is illustrated applied to a portion 31 of the first side 32 of the glass panel 30). The primer 85, as described in further detail below, may be applied to the glass panel 30 prior to its introduction within the plastic frame 100. Still further, as will also be described in further detail below, the primer 85 may be applied in conjunction with the application of the encapsulant 200 to the first side 32 and/or the second side 34 of the glass panel 30.

For ease in description hereinafter, the glass panel 30, 50, 90 of any of the above embodiments (including glass panels having a primer 85 as in FIG. 6), is hereinafter referred to as "the glass panel 30", which as noted above maybe be either in the form of a laminated glass panel 50 or a tempered glass panel 90. Accordingly, in each of the further Figures and descriptions, the description of any aspect of the glass panel 30 equally applies to the corresponding aspect of the laminated glass panel 50 or tempered glass panel 90. For example, a description of the first side 32 of the glass panel 30 also describes the first side 62 of the laminated glass panel 50 and to the first side 92 of the tempered glass panel 90.

In addition to the glass panel 30, the encapsulated glass assembly 25 also includes a frame (shown as 100 in FIGS. 1 and 7-21) coupled to the glass panel 30 (i.e., wherein the glass panel 30 is introduced into the plastic frame 100). As used herein, the term "introduced" can be used interchangeably with the term "installed" with respect to introducing/installing the glass panel 30 to the plastic frame 100.

The plastic frame 100 is preferably formed from a hard plastic material and includes an outer frame surface (shown as 106 in FIGS. 7-21 below). In certain embodiments, the plastic material used in forming the plastic frame 100 is a material that, when formed to its final shape, has a Shore D hardness exceeding 50, such as from 55 to 95, such as from 70 to 85. Shore Hardness as described in the present invention may be measured with a durometer using the procedure described in ASTM D2240. In certain embodiments, the hard plastic material is polypropylene or a thermoplastic polyolefin (TPO) that is molded to a desired shape to form the plastic frame 100. In embodiments wherein the hard plastic material is polypropylene, the Shore D hardness ranges from 55 to 95, such as from 70 to 85.

In certain embodiments, the plastic frame 100 is a one-piece structure that is formed to generally coincide to the shape of the glass panel 30 such that the glass panel 30 may be contained within the plastic frame 100 when the glass panel 30 is coupled to the plastic frame 100. Exemplary one-piece frames 100 are described below. As noted above the glass panel described with respect to these respective glass assemblies 25 is designated by reference numeral 30 and includes the afore-mentioned first and second sides 32, 34 and edge 36 unless otherwise indicated. Still further, the glass panel 30 described in these assemblies can be either the laminated glass panel 50 or tempered glass panel 90 unless otherwise expressly specified.

In general, the plastic frame 100 is formed in its final shape prior to coupling to glass panel 30, or otherwise provided in its final shape prior coupling to the glass panel 30, as described in further detail below.

For polypropylene frame plastic frames 100, the manufacturing (i.e., molding) may be performed in an injection mold having a cavity portion having the desired dimensions and the shape, such as the dimensions and shapes for any of the plastic frames 100 illustrated in any one of the FIGS. 1-21 as described herein. In certain embodiments, the plastic frame 100 is molded in an injection mold (not shown). Exemplary, non-limiting injection molds that may be used include injection molding equipment commercially available from Krauss-Maffei Corporation of Munich, Germany. Exemplary molding conditions for forming any of the plastic frames 100 using the injection molding equipment commercially available from Krauss-Maffei Corporation are as follows: mold temperatures ranging from about 110 to 140 degrees Fahrenheit (about 43 to 60 degrees Celsius); injection pressures ranging from about 6600 to 7250 pounds per square inch (about 4.62 to 5.20 MPa (MegaPascals)); barrel temperatures ranging from 400 to 450 degrees Fahrenheit (about 204 to 232 degrees Celsius); and fill times ranging from 1.9 to 2 seconds.

Figure 8A:
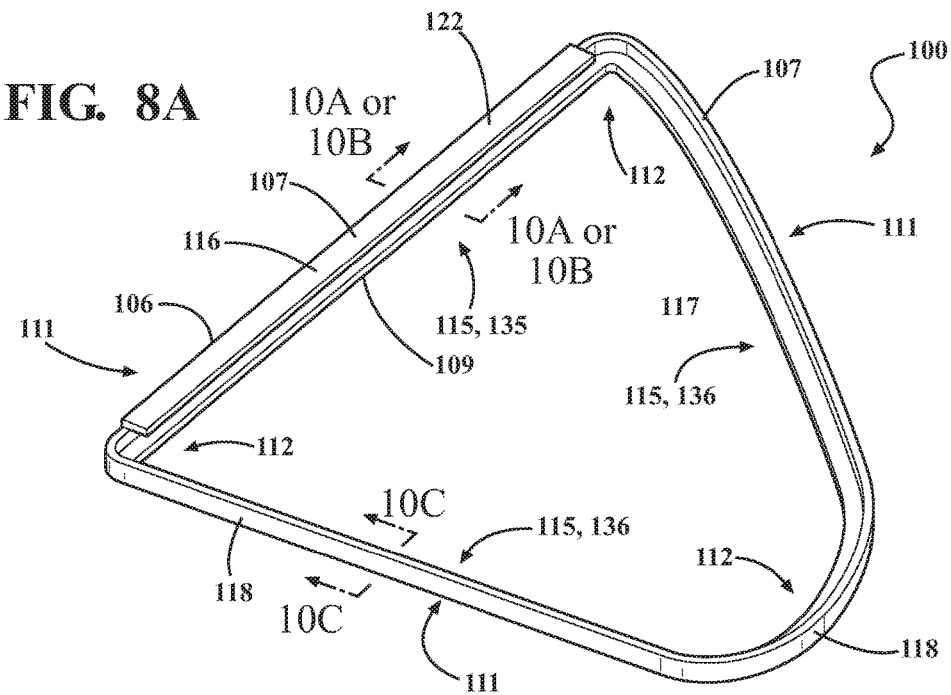
FIG. 8A is a perspective view of a plastic frame for use in the encapsulated glass assembly in accordance with another embodiment of the present invention.
Figure 9:
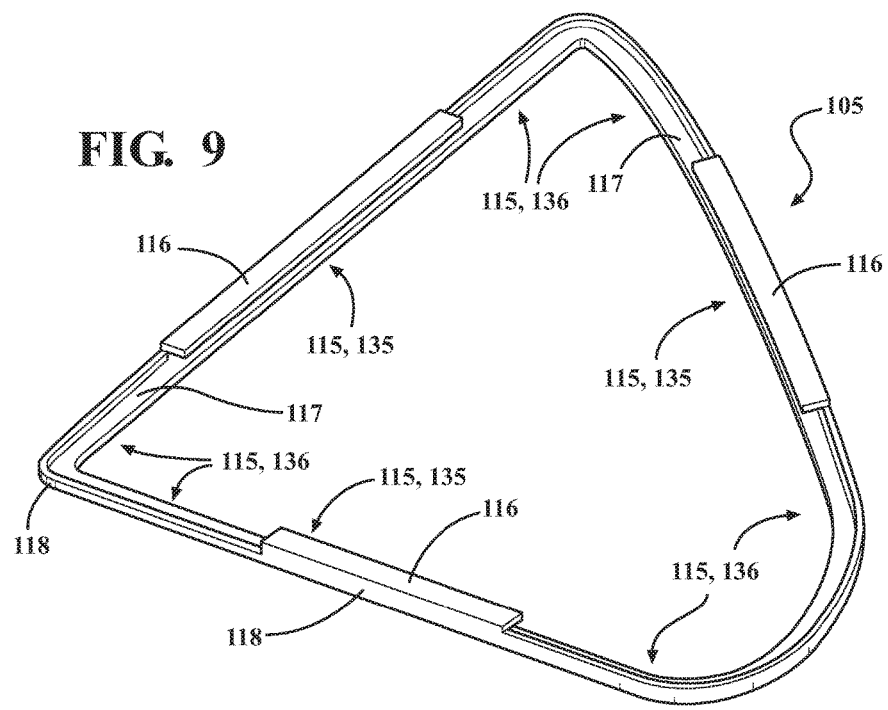
FIG. 9 is a perspective view of a plastic frame for use in the encapsulated glass assembly in accordance with yet another embodiment of the present invention.

Referring first to FIGS. 7-9, a plastic frame 100 in accordance with the present invention has an outer frame surface 106 that includes an upper surface 107 and an opposing lower surface 108. An inner surface 109 and an opposing outer surface 110, respectively, connect the upper surface 107 to the lower surface 108. The terms upper and lower, as described herein with respect to any component, are not meant to imply a relative orientation of such component with respect to the earth. Accordingly, the upper surface 107 of the plastic frame 100 may be positioned closer or further from the earth relative to the lower surface 108 of the plastic frame 100 during use and should not be therefore considered limiting.

As noted above, the plastic frame 100 is generally shaped to coincide to the shape of the glass panel 30 such that such that the glass panel 30 is at least partially contained within the plastic frame 100. In embodiments wherein the glass panel 30 is formed having at least three sides 38 defined along the edge 36 and including corners 40 disposed between each adjacent pair of sides 38, the inner surface 109 thus includes a corresponding number of adjacent sides 111 and corners 112, with each of the corners 112 defined as the transition between the adjacent sides 111.

In these embodiments, a channel 115 extends within the outer frame surface 106. The channel 115, as shown best in FIGS. 7-9 and 10A-10C, has a lower wall portion 117 extending from, and in certain embodiments connected to, a side wall portion 118. The lower wall portion 117 terminates at an edge portion 119 remote from the side wall portion 118. In addition, at least a portion of the channel 115 along at least one of the respective sides 111 of the plastic frame 100 includes at least one upper wall portion 116, with each one of the at least one upper wall portions 116 extending from, and in certain case connected to, the side wall portion 118 along a respective upper length of the side wall portion 118. In these embodiments, the upper wall portion 116 is spaced from the lower wall portion 117. Accordingly, a portion of the channel 115 along at least one of the respective sides 111 of the plastic frame 100 having one of the the upper wall portions 116 can further be defined as a C-shaped channel 135 (as shown best in FIGS. 10A and 10B), whereas any portion of the channel 115 not having one of the at least one upper wall portions 116 can further be defined as a respective L-shaped channel 136 (as shown best in FIG. 10C).

In one embodiment in which the plastic frame 100 has exactly one upper wall portion 116, such as shown in FIGS. 7, 8A and 8B, the upper wall portion 116 may cover the entire upper length of the side wall portion 118 along each respective one or more side 111 of the plastic frame 100 (i.e., wherein the upper wall portion 116 extends from the side wall portion 118 along its entire length corresponding to its upper surface (its entire upper length) opposite and remote from the lower wall portion 117).

Accordingly, in one embodiment as shown in FIG. 7, the entirety of each respective side 111 and each respective corner 112 of the plastic frame 100 has the upper wall portion 116, the side wall portion 118 and the lower wall portion 117, and thus defines a single respective C-shaped channel 135.

In an alternative embodiment, as shown best in FIG. 8A, the plastic frame 100 has exactly one upper wall portion 116 extending along a single side 111 of the plastic frame 100. In these embodiments, the channel 115 and the single side 111 includes the upper wall portion 116, the side wall portion 118 and the lower wall portion 117 and therefore defines a single respective C-shaped channel 135. In embodiments (not shown) wherein the upper wall portion 116 does not extend along the entire length of the single side 111 of the plastic frame, another portion of the channel 115 along the single side 111 not having the upper wall portion 116 (but having the side wall portion 118 and lower wall portion 117) defines a respective L-shaped channel 136 on the single side 111 of the plastic frame 100. If the C-shaped channel 135 extends to one of the corners 112, then a single L-shaped channel 135 is provided that extends to the opposite corner 112 of the single side 111. If the C-shaped channel 135 does not extend to either corner 112, than a pair of L-shaped channels 136 are located on the single side 111 of the plastic frame 100 that are separated from each other by the C-shaped channel 135.

Thus, as represented by FIG. 8A in one non-limiting example wherein the plastic frame 100 includes three adjacent sides 111, the plastic frame 100 can include an upper wall portion 116 that traverses an entire length of a single side 111 of the plastic frame 100 between the corners 112 that includes therefore a single C-shaped channel 135.

In yet another alternative embodiment in which the plastic frame 100 has exactly one upper wall portion 116, the upper wall portion 116 does not extend the entire length of the side wall portion 118 on each of the respective sides 111 and corners 112 of the plastic frame 100, but does extend along at least two adjacent sides 111 and includes each corresponding corner 112 between the two or more respective adjacent sides 111. In these embodiments, the channel 115 of at least two or more respective adjacent sides 111 (and the respective corner 112 between each pair of the respective adjacent sides 111) includes the upper wall portion 116 (in addition to the side wall portion 118 and lower wall portion 117) and therefore defines a single respective C-shaped channel 135 (as described above), while another portion of the channel 115 not having the upper wall portion 116 (but having the side wall portion 118 and lower wall portion 117) along each of the respective adjacent sides 111 and along each of the other sides 111 defines a single respective L-shaped channel 136.

Thus, as represented by FIG. 8B in another non-limiting example wherein the plastic frame 100 includes three adjacent sides 111, the plastic frame 100 can include an upper wall portion 116 that traverses two adjacent sides 111 and a corresponding corner 112 between the adjacent sides 111 that includes therefore a single C-shaped channel 135 and a single L-shaped channel 136 (which also extends along each of the additional sides 111, here one side 111) as illustrated in FIG. 8B).

In still another alternative embodiment of the present invention, the plastic frame 100 may include a plurality of spaced apart upper wall portions 116 along one or more of the respective sides 111 of the plastic frame 100. In one representative depiction of this alternative embodiment, as illustrated in FIG. 9, one or more respective sides 111 of the plastic frame 100 includes a single upper wall portion 116 positioned between the respective corners 112 that defines a single C-shaped channel 135 and a pair of respective L-shaped channels 136 on either side of the single C-shaped channel 135 along each single respective side 111 of the plastic frame 100.

In yet another alternative embodiment (not shown), the plastic frame 100 includes two more upper wall portions 116 spaced apart relative to one another along a single side 111 of the plastic frame 100. Accordingly, in this embodiment, the respective side 111 includes at least two C-shaped channels 135 (with each of the two C-shaped channels 135 defined by a respective one of the upper wall portions 116, the side wall portion 118, and the lower wall portion 117), with each respective pair of C-shaped channels 135 separated from one another by a respective L-shaped channel 136. In embodiments having exactly two upper wall portions 116 extending to the respective corners 112, exactly one L-shaped channel 136 is provided on the single one side 111 of the plastic frame 100. In embodiments having exactly two upper wall portions 116, but wherein only one of the upper wall portions 119 extends to the respective corners 112, the single side 111 includes two C-shaped channels 135 and two L-shaped channels 136. In embodiments having exactly two upper wall portions 116, but wherein neither one of the upper wall portions 116 extends to the respective corners 112, the single side 111 includes two C-shaped channels 135 and three L-shaped channels 136, wherein two of the three L-shaped channels 136 extends to a respective corner 112 along the one side 111 of the plastic frame.

Figure 10A:
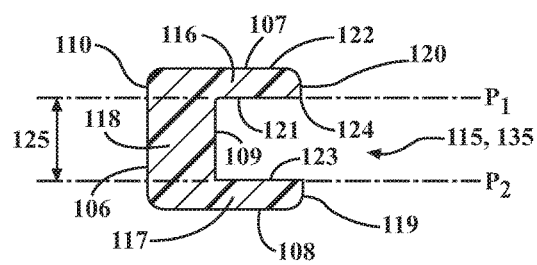
FIG. 10A is a section view of FIG. 7, 8A or 8B taken along line 10A-10A.
Figure 10B:
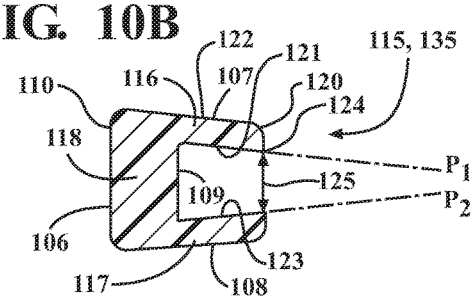
FIG. 10B is a section view of FIG. 7, 8A or 8B taken along line 10B-10B.
Figure 10C:
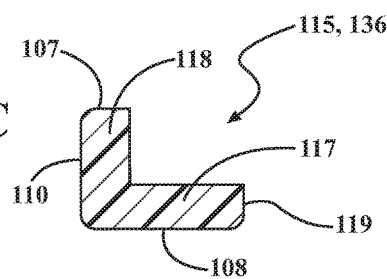
FIG. 10C is a section view of FIG. 8A or 8B taken along line 10C-10C.

As noted briefly above, each respective C-shaped channel 135 of the plastic frame 100, in accordance with any embodiment described herein and as best shown in FIGS. 10A and 10B in alternative forms, is defined by the side wall portion 118, the one of the at least one upper wall portions 116 extending from the side wall portion 118, and the lower wall portion 117 extending from side wall portion 118. In these embodiments, each one of the at least one upper wall portions 116 terminates at an edge portion 120 remote from the side wall portion 118.

In addition, each respective one of the upper wall portions 116 of the plastic frame 100 also has an inner surface 121 extending from the side wall portion 118 to its respective edge portion 120. Yet still further, each respective one of the at least one upper wall portions 116 of the plastic frame 100 also has an opposing outer surface 122 extending from the respective edge portion 120 such that the edge portion 120 connects the inner and outer surfaces 121, 122 of a respective one of the at least one upper wall portion 116 and such that the inner surface 121 is located between the lower wall portion 117 and the outer surface 122. The outer surface 122 may be defined as a portion of the upper surface 107 or may be considered to extend from the upper surface 107.

In certain embodiments as shown in FIG. 10A, a plane P1 defined by the inner surface 121 of the upper wall portion 116 of the plastic frame 100 and a plane P2 defined by an inner surface 123 of the lower wall portion 117 of the plastic frame 100 are substantially parallel to one another. Accordingly, a gap 125, defined as the distance between the respective inner surfaces 121, 123, is consistent. Preferably, this gap 125 is greater than the thickness of the glass panel 30 measured from the first side 32 to the second side 34 in a direction normal to the first and second side 32, 34.

Alternatively, the plane P1 and the plane P2 of the plastic frame 100 are not parallel with one another. Accordingly, as shown in one embodiment in FIG. 10B, the gap 125 between the respective inner surfaces 121, 123 decreases along the respective planes P1, P2 in a direction away from the side wall portion 118 (i.e., the planes P1, P2 will intersect at a distance remote and inward from the side wall portion 118 and towards another side 111 of the plastic frame 100). Preferably, the gap 125 between the inner surfaces 121, 123 measured in a direction normal to the inner surface 123 and extending from the outer edge 124 of the inner surface 123 of the upper wall portion 116 is less than the thickness of the glass panel 30 measured from the first side 32 to the second side 34 in a direction normal to the first and second side 32, 34, while the gap 125 between the inner surfaces 121, 123 measured along a plane parallel to the side wall portion 1118 and at the intersection of the respective inner surfaces 121, 123 with the side wall portion 118 is greater than the thickness of the glass panel 30.

To couple the glass panel 30 to the plastic frame 100 in accordance with any embodiment described above, and illustrated with respect to the embodiments shown in FIGS. 11-14 below, the glass panel 30 is pressed onto the outer surface 122 of the one or more upper wall portions 116 on each of the respective sides 111 and/or corners 112 of the plastic frame 100 including a respective upper wall portion 116 in a direction towards the lower wall portion 117, causing the outer edge 124 of the respective one of the upper wall portions 116 to move in a direction inwardly towards the side wall portion 118 (shown best in FIG. 11). Accordingly, the one or more upper wall portions 116 have a degree of flexibility that allows them to be displaced (i.e., bent) in a direction towards the lower wall portion 117 without breaking.

Figure 12:
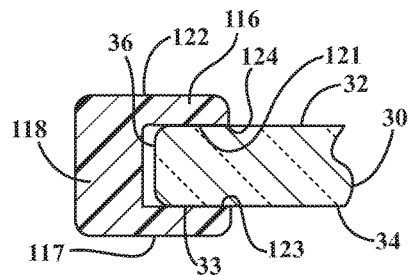
FIG. 12 is a side perspective view of a portion of the plastic frame of any one of FIGS. 7-9 illustrating the C-shaped channel according to FIG. 10A after coupling the glass panel to the plastic frame.
Figure 13:
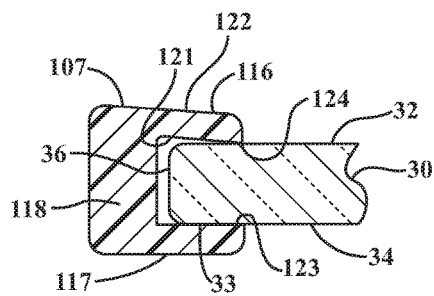
FIG. 13 is a side perspective view of a portion of the plastic frame of any one of FIGS. 7-9 illustrating the C-shaped channel according to FIG. 10B after coupling the glass panel to the plastic frame.

Once the edge 36 of the glass panel 30 clears the outer edge 124 of the upper wall portion 116, as shown in FIGS. 12 and 13, the second side 34 of the glass panel 30 may be seated against the lower wall portion 117, and the outer edge 124 is returned to its original position such that a first side 32 of the glass panel 30 is adjacent to the inner surface 121 of the upper wall portion 116. As a result, the glass panel 30 is retained within the C-shaped channels 135 between the inner surface 121 of the upper wall portion 116 and the inner surface 123 of the lower wall portion 117 along each of the sides 111 and corners 112 including such channels 135 and wherein the edge 36 of the glass panel is adjacent to the inner surface 109 of the side wall portion 118.

In embodiments of the plastic frame 100 wherein P1 is parallel to P2, as shown in FIG. 12, the inner surface 121 of the upper wall portion 116 is aligned and generally parallel with the first side 32 of the glass panel 30, and the inner surface 123 of the lower edge portion 117 is aligned with and generally parallel with the second side 34 of the glass panel 30. Alternatively, in embodiments of the plastic frame 100 wherein the gap 125 between the respective inner surface 121, 123 decreases along the respective planes P1, P2 in a direction away from the side wall portion 118, as shown in FIG. 13, the outer edge 124 of the inner surface 121 of the upper wall portion 116 remains in resilient contact with the first side 32 of the glass panel 30, thereby retaining the glass panel 30 within each one of the respective C-shaped channels 135.

Figure 14:
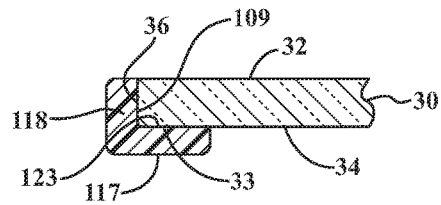
FIG. 14 is a side perspective view of a portion of the plastic frame of FIGS. 8A, 8B and 10C illustrating the L-shaped channel after coupling the glass panel to the plastic frame.

In embodiments including at least one L-shaped channel 136 in addition to the one or more C-shaped channels 135, as shown in FIG. 14, a portion 33 of the second side 34 of the glass panel is seated onto the inner surface 123 of the lower wall portion 117 and a respective edge 36 of the glass panel 30 is positioned adjacent to the inner surface 109 of the side wall portion 118 corresponding to the L-shaped channel 136.

Figure 11:
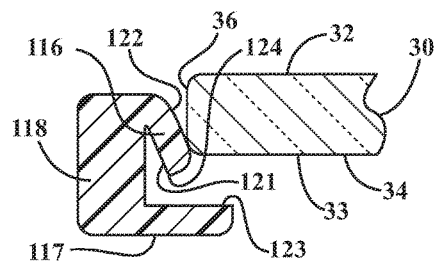
FIG. 11 is a side perspective view of a portion of the plastic frame of any one of FIGS. 7-9 illustrating the C-shaped channel according to FIG. 10A during the step of coupling the glass panel to the plastic frame.

In embodiments having a single C-shaped channel 135 located along a single side 111 of the plastic frame 100, such as the frame illustrated in FIG. 8A, the procedure for coupling the glass panel 30 to the plastic frame 100 may be performed without the need to displace the outer edge 124 of the respective one of the upper wall portions 116 to move in a direction inwardly towards the side wall portion 118 as shown in FIG. 11. Instead, a first side 38 of the glass panel is inserted within the C-shaped channel 135 on the single side 111 of the plastic frame 100 and at a slight angle relative to the inner surface 123 of the lower wall portion 117 (wherein the edge 36 of the glass panel 30 on an opposite side 38 from the side being inserted is further away from the inner surface 123 of the lower wall portion than the adjacent side 38). Once the edge 36 of the side of the glass panel 30 is adjacent to inner surface 109 of side wall portion 108, the entire glass panel 30 is moved towards the inner surface 123 of the lower wall portion such that the second side 34 of the glass panel 30 is seated onto the inner surface 123 and such that the edge 36 of the glass panel is adjacent to the entirety of the side wall portion 118 along each respective sides 111 and corners 112 of the plastic frame 100.

Once the glass panel 30 coupled to the plastic frame 100 in accordance with any of the embodiments as shown above, and as further shown in FIGS. 15-17, an encapsulant 200 is applied onto the glass panel 30 and the plastic frame 100 to secure the plastic frame 100 to the glass panel 30.

Figure 15A:
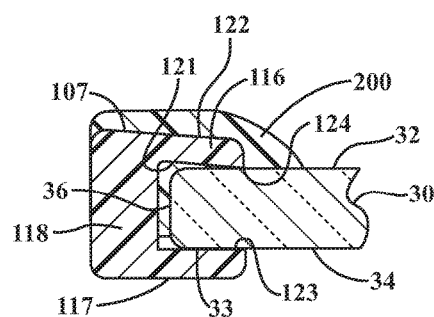
FIG. 15A is a side perspective view of a portion of the plastic frame of FIG. 13 after application of a one-sided encapsulant in accordance with one embodiment of the present invention.

In one embodiment that includes the afore-mentioned at least one C-shaped channel 135 and optionally the at least one L-shaped channel 136, the encapsulant 200 is bonded to the first side 32 of the glass panel 30 and to a portion of the plastic frame 100 including the at least one C-shaped channel 135 and optionally the L-shaped channel 136 associated with the first side 32 of the glass panel 30. Accordingly, as shown in FIG. 15A with respect to the C-shaped channel 135, the encapsulant 200 is bonded onto the upper surface 107 of the outer frame surface 106, the outer surface 122 of the upper wall portion 116, and onto an uncovered portion 37 of the first side 32 of the glass panel 30. In embodiments wherein the plastic frame 100 also includes at least one L-shaped channel 136 in addition to the one or more C-shaped channels 135, as shown in FIG. 15B, the encapsulant 200 is also bonded onto the upper surface 107 of the outer frame surface 106 and onto an uncovered portion 39 of the first side 32 of the glass panel 30 of the portion of the plastic frame 100 corresponding to the L-shaped channel 136.

Relatedly, in another embodiment (not shown), as opposed to bonding the encapsulant 200 to the first side 32 of the glass panel 30 in accordance with FIGS. 15A and/or 15B as described above, the encapsulant 200 may instead be bonded to the second side 34 of the glass panel 30 in substantially the same manner as described in FIGS. 15A and/or 15B.

Figure 15B:
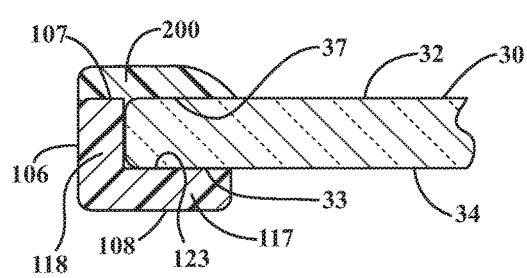
FIG. 15B is a side perspective view of a portion of the plastic frame of FIG. 14 after application of a one-sided encapsulant in accordance with one embodiment of the present invention.
Figure 16A:
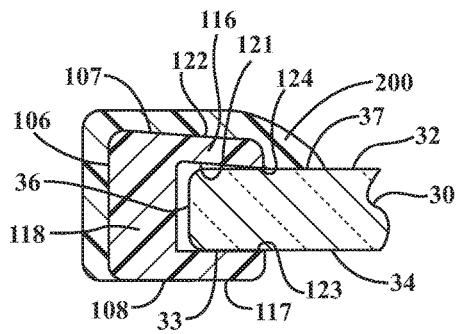
FIG. 16A is a side perspective view of a portion of the plastic frame of FIG. 13 after application of a two-sided encapsulant in accordance with one embodiment of the present invention.

In an alternative embodiment that includes the afore-mentioned at least one C-shaped channel 135 and optionally the at least one L-shaped channel 136, the encapsulant 200 is also bonded to the outer surface 110 of the side wall portion 118 of the plastic frame 100 in addition to being bonded to the glass panel 30 and plastic frame 100 as described in FIGS. 15A and 15B. Accordingly, as such as shown in FIG. 16A with respect to the C-shaped channel 135, the encapsulant 200 is bonded onto the outer surface 110 of the side wall portion 118, the upper surface 107 of the outer frame surface 106, the outer surface 122 of the upper wall portion 116, and onto the uncovered portion 37 of the first side 32 of the glass panel 30 of the portion of the plastic frame 100 including the C-shaped channel 135. In embodiments wherein the plastic frame 100 includes at least one L-shaped channel 136 in addition to the one or more C-shaped channels 135, the encapsulant 200 is also bonded onto the outer wall surface 110 of the side wall portion 118, the upper surface 107 of the outer frame surface 106, and onto an uncovered portion 39 of the first side 32 of the glass panel 30 of the portion of the plastic frame 100 corresponding to the L-shaped channel 135, as shown in FIG. 16B.

Relatedly, in another embodiment (not shown), as opposed to bonding the encapsulant 200 to the first side 32 of the glass panel 30 in accordance with FIGS. 16A and/or 16B as described above, the encapsulant 200 may instead be bonded to the second side 34 of the glass panel 30 in substantially the same manner as described in FIGS. 16A and/or 16B.

Figure 16B:
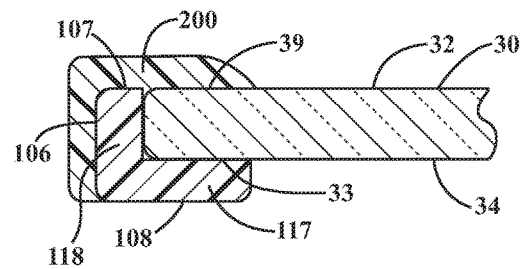
FIG. 16B is a side perspective view of a portion of the plastic frame of FIG. 14 after application of a two-sided encapsulant in accordance with one embodiment of the present invention.
Figure 17A:
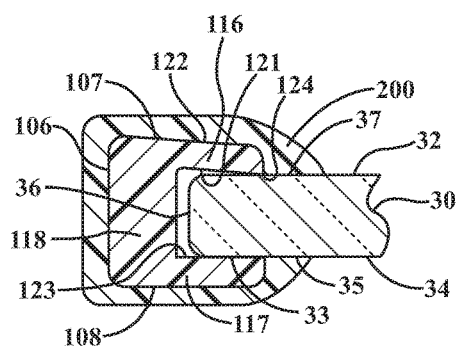
FIG. 17A is a side perspective view of a portion of the plastic frame of FIG. 13 after application of a three-sided encapsulant in accordance with one embodiment of the present invention.
Figure 17B:
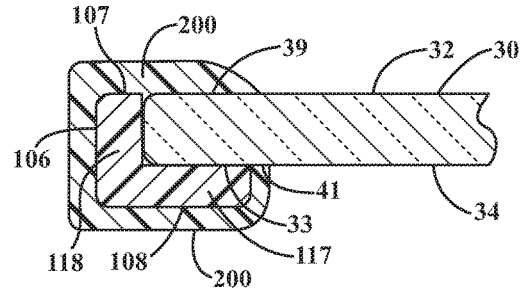
FIG. 17B is a side perspective view of a portion of the plastic frame of FIG. 14 after application of a three-sided encapsulant in accordance with one embodiment of the present invention.

In yet another alternative embodiment that includes the afore-mentioned at least one C-shaped channel 135 and optionally the at least one L-shaped channel 136, the encapsulant 200 is also bonded to the lower surface 108 of the lower wall portion 117 and onto the second side 34 of the glass panel 30 in addition to being bonded to the glass panel 30 and plastic frame 100 as described in FIGS. 16A and 16B. Accordingly, as shown in FIG. 17A with respect to the C-shaped channel 135, the encapsulant 200 is bonded onto the upper surface 107 of the outer frame surface 106, the outer surface 122 of the upper wall portion 116, the uncovered portion 37 of the first side 32 of the glass panel 30, the outer wall surface 110 of the side wall portion 118, the lower surface 108 of the lower wall portion 117, and the uncovered portion 35 of the second side 34 of the glass panel 30. With respect to the L-shaped channel 135, when present, as shown in FIG. 17B, the encapsulant 200 is bonded onto the upper surface 107 of the outer frame surface 106, the uncovered portion 37 of the first side 32 of the glass panel 30, the outer wall surface 110 of the side wall portion 118, the lower surface 108 of the lower wall portion 117, and an uncovered portion 41 of the second side 34 of the glass panel 30.

In further embodiments, as shown in FIGS. 18-21, the upper wall portions 116 of the plastic frames in accordance with any of the embodiments of FIGS. 7-9 above are not integrally formed with the lower wall portion 117 and side wall portion 118 as a single component or piece, but instead are separate components or pieces distinct from the lower wall portion 117 and side wall portion 118, referred to herein as clamping devices 140 or 150, that are the functional equivalent of the upper wall portions 116 as described above.

Figure 18:
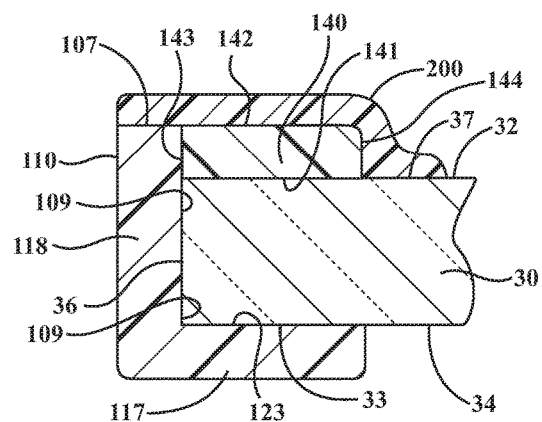
FIG. 18 is a side view of an alternative version of the plastic frame used in the encapsulated glass assembly and having a one-sided encapsulant applied thereon in accordance with another embodiment of the present invention after installation of the glass panel and encapsulant.
Figure 19:
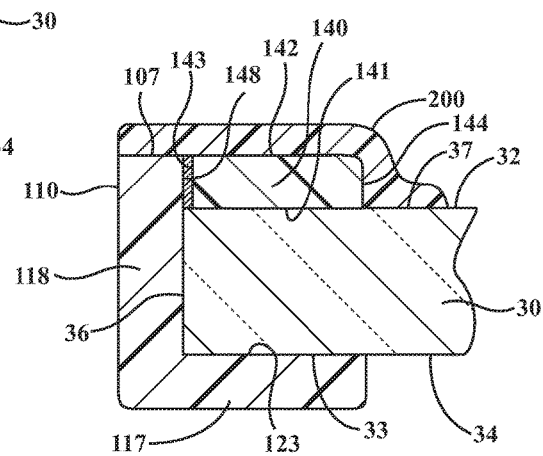
FIG. 19 is a side view of an alternative version of the plastic frame of FIG. 18.

In certain embodiments, as shown in FIGS. 18 and 19, a clamping device 140 replaces the upper wall portion 116. In these embodiments, each one or more clamping devices 140 has an inner surface 141 and an outer surface 142 and includes an inner edge surface 143 and outer edge surface 144 connecting the inner surface 141 to the outer surface 142 at either end. In these embodiments, the inner surface 141 faces the lower wall portion 117 such that the inner surface 141 is located between the outer surface 142 and the lower wall portion 117. In addition, the inner edge surface 143 is positioned adjacent to the side wall portion 118. Accordingly, the inner surface 141, the side wall portion 118 and the lower wall portion 117 define the C-shaped channel 135. Still further, the outer surface 142 extends from and is generally coplanar with the upper surface 107 of the outer frame surface 106 of the side wall portion 118.

In certain embodiments, as shown in FIG. 18, the inner edge surface 143 is not attached to the side wall portion 118 but remains adjacent to the side wall portion 118 after installation. In alternative embodiments, as shown in FIG. 19, the inner edge surface 143 is attached to the side wall portion 118 via one or more fastening devices 148 such as screws, nails, welds, or adhesives (an adhesive 148 is shown in FIG. 19). In these embodiments, the inner edge surface 143 may be attached to the side wall portion 118 either prior to, or after, installation of the glass panel 30 onto the plastic frame 100 but prior to the application of the encapsulant 200.

In embodiments wherein the clamping device 140 is not attached to the side wall portion 118, as shown in FIG. 18, the procedure for installing the clamping device 140 onto the glass panel 30 and frame 100 and then coupling the encapsulant 200 is as follows. First, the clamping device 140 is positioned onto the first side 32 of the glass panel 30 such that the inner surface 141 adjacent to first side 32 and such that inner edge surface 143 is abutting the side wall portion 118. Next, the encapsulant 200 is applied onto the upper surface 107 of the inner wall portion 118, the outer surface 142 of the clamping device 140 and onto the uncovered portion 37 of the first side 32 of the glass panel 30. In alternative embodiments (not shown), the encapsulant 200 may also be applied to the outer surface 110 of the outer frame surface 106. In still further alternative embodiments (not shown), the encapsulant 200 may also be applied to the outer surface 110 of the side wall portion 118, the lower surface 108 of the lower wall portion 117, and onto the uncovered portion 35 of the second side 34 of the glass panel 30.

In embodiments wherein the clamping device 140 is attached to the side wall portion 118, as shown in FIG. 19, the attachment using the one or more fastening devices 148 is done prior to the application of the encapsulant 200 and depends upon the fastening device utilized. Accordingly, as illustrated in FIG. 19, in which the fastening device 148 is an adhesive, the installation proceeds by first applying the adhesive 148 onto either the inner edge surface 143 of the clamping device 140 and/or onto inner surface 109 of the side wall portion 118. The clamping device 140 is positioned onto the first side 32 of the glass panel 30 such that the inner surface 141 is positioned adjacent to first side 32 and such that adhesive 148 bonds together the inner edge surface 143 and the inner surface 109 of the side wall portion 118. Next, the encapsulant 200 is applied as described above in the paragraph immediately above.

In alternative embodiments (not shown), wherein the fastening device 148 is a nail or a screw, the procedure for installing the clamping device 140 and then coupling the encapsulant 200 is as follows. First, the clamping device 140 is positioned onto the first side 32 of the glass panel 30 such that the inner surface 141 is positioned adjacent to first side 32 near the edge 36 and such that inner edge surface 143 is abutting side wall portion 118. Next, the fastening device 148 is installed to couple the inner edge surface 143 of the clamping device 140 to the side wall portion 118. For example, when the fastening device 148 is a screw or nail, the screw or nail are fastened through the side wall portion 118 of the plastic frame 100 and into the inner edge surface 143 to secure the side wall portion 118 to the inner edge surface 143. Next, the encapsulant 200 is applied as described above.

Figure 20:
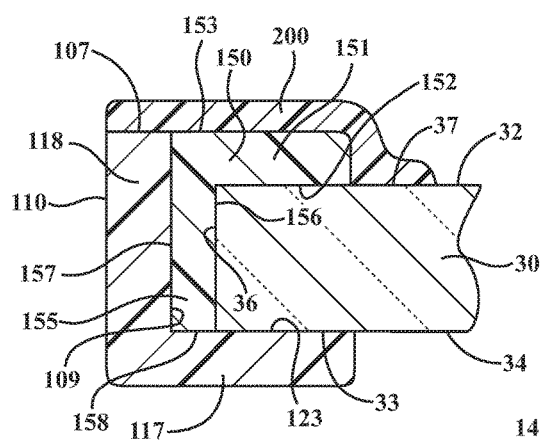
FIG. 20 is a side view of yet another alternative version of the plastic frame used in the encapsulated glass assembly and having a one-sided encapsulant applied thereon in accordance with another embodiment of the present invention after installation of the glass panel and encapsulant.
Figure 21:
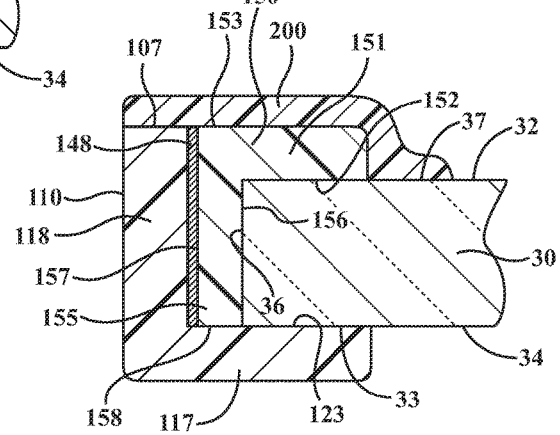
FIG. 21 is a side view of an alternative version of the plastic frame of FIG. 20.

In other alternative embodiments, as shown in FIGS. 20 and 21, the one or more clamping devices 150 are generally L-shaped and include a first leg 151 and a second leg 155. In these embodiments, the first leg 151 has an inner surface 152 and an outer surface 153 and includes outer edge surface 154 connecting the inner surface 152 to the outer surface 153. The second leg 155 includes an inner surface 156 and on outer surface 157 and a lower edge surface 158 connecting the inner surface 156 to the outer surface 157. Still further the inner surface 156 of the second leg 155 is coupled to and extends from the inner surface 152 of the first leg 151 in a direction normal to the inner surface 152 of the first leg 151. Similarly, the outer surface 157 of the second leg 155 is coupled to and extends from the outer surface 153 of the first leg 151 in a direction normal to the outer surface 153 of the first leg 151.

In certain embodiments, as shown in FIG. 20, the outer surface 157 of the second leg 155 is not attached to the side wall portion 118, but remains adjacent to an inner surface 109 of the side wall portion 118. In certain embodiments, as shown in FIG. 23, the outer surface 157 of the second leg 155 is attached to the inner surface 109 of the side wall portion 118 via one or more fastening devices 148 such as screws, nails, welds, or adhesives. In these embodiments, the outer surface 157 may be attached to the side wall portion 118 either prior to, or after, the coupling of the glass panel 30 to the plastic frame 100, but prior to the application of the encapsulant 200.

In embodiments wherein the outer surface 157 of the one or more clamping devices 150 are not attached to the side wall portion 118, as shown in FIG. 20, the procedure for installing the clamping device 150 onto the glass panel 30 and frame 100 and then coupling the encapsulant 200 is as follows. First, the clamping device 150 is positioned onto the first side 32 of the glass panel 30 such that the inner surface 152 of the first leg 151 is positioned adjacent to first side 32 and such that second leg 155 is positioned between the edge 36 and the inner surface 109 of the side wall portion 118, wherein the inner surface 156 of the second leg 155 is adjacent to the edge 36 of the glass panel 30 and wherein the outer surface 157 of the second leg 155 is adjacent to the inner surface 109 of the side wall portion 118. Next, the encapsulant 200 is applied onto the upper surface 107 of the side wall portion 108, the outer surface 153 of the first leg 151 of the clamping device 150 and onto the uncovered portion 37 of the first side 32 of the glass panel 30. In alternative embodiments (not shown), the encapsulant 200 may also be applied to the outer surface 110 of the side wall portion 118. In still further alternative embodiments (not shown), the encapsulant 200 may also be applied to the outer surface 110 of the side wall portion 118, the lower surface 108 of the lower wall portion 117, and onto the uncovered portion 35 of the second side 34 of the glass panel 30.

Alternatively, in embodiments wherein the one or more clamping devices 150 are attached to the side wall portion 118 via the fastening device 148 and wherein the fastening device 148 is an adhesive, as shown in FIG. 21, the procedure for installing the clamping device 150 onto the glass panel 30 and frame 100 and then coupling the encapsulant 200 is as follows. First, the adhesive 148 is applied onto the outer surface 157 of the second leg 155 and/or onto the inner surface 109 of the side wall portion 118. Next, the clamping device 150 is positioned onto the first side 32 of the glass panel 30 such that the inner surface 152 of the first leg 151 is positioned adjacent to first side 32 and such that second leg 155 is positioned between the edge 36 and the side wall portion 118, wherein the inner surface 156 is adjacent to the edge 36 of the glass panel 30 and wherein the adhesive 148 bonds the outer surface 157 of the second leg 155 to the inner surface 109 of the side wall portion 118. Next, the encapsulant 200 applied as described in the previous paragraph.

Alternatively, in embodiments wherein the one or more clamping devices 150 are attached to the side wall portion 118 via the fastening device 148 and wherein the fastening device 148 is not an adhesive (not shown), the procedure for installing the clamping device 150 onto the glass panel 30 and frame 100 and then coupling the encapsulant 200 is as follows. First, the clamping device 150 is positioned onto the first side 32 of the glass panel 30 such that the inner surface 152 of the first leg 151 is positioned adjacent to first side 32 and such that second leg 155 is positioned between the edge 36 and the side wall portion 118, wherein the inner surface 156 is adjacent to the edge 36 of the glass panel 30 and wherein the outer surface 157 is adjacent to the inner surface 109 of the side wall portion 118. Next, the fastening device 148 is installed to couple the outer surface 157 to the inner surface 109 of the side wall portion 118. For example, when the fastening device 148 is a screw or nail, the screw or nail are fastened through the inner surface 109 of the side wall portion 118 of the plastic frame 100 and into the outer surface 157 to secure the side wall portion 118 to the second leg 155. Next, the encapsulant 200 is applied as described above.

As noted above, in addition to the glass panel 30 and plastic frame 100 as described above in accordance with any embodiment, the encapsulated glass assembly 25 also includes an encapsulant 200 which is bonded to at least one of the first side 32 and the second side 34 of the glass panel 30 and which is also bonded to the outer surface of the plastic frame 100 and therefore secures the glass panel 30 to the plastic frame 100.

The encapsulant 200 has a Shore hardness that is less than the Shore Hardness of the respective plastic frame 100. In other words, the encapsulant 200 is softer than the respective plastic frame 100. Still further, the encapsulant 200 sealingly bonds to the glass panel 30 and therefore provides a moisture seal to prevent water migration between the glass panel 30 and the encapsulant 200 that could not be achieved using polypropylene encapsulants.

The Shore Hardness of the encapsulant 200 is dependent upon the composition of the encapsulating material used to form the encapsulant 200. However, as noted above, the Shore hardness of the encapsulant 200, in any embodiment of the present invention as described above and regardless of the composition of the encapsulating material used to form the encapsulant, is less than the Shore hardness of the plastic frame 100.

In certain embodiments, the encapsulating material used to form the encapsulant 200 is a thermoplastic elastomer, or TPE (i.e., it is a TPE-based encapuslating material). Accordingly, in these embodiments, the encapsulant 200 is, or otherwise may be referred to, as TPE. Exemplary TPE-based materials that can be used as the encapsulating material is SBS (poly(styrene-butadiene-styrene), also alternatively referred to as a styrene-butadiene-styrene block copolymer), and SEBS (styrene-ethylene-butylene-styrene block copolymers). Exemplary TPE materials such as SBS and SEBS form encapsulants 200 having a Shore hardness ranging from 0A to 60D, as measured in accordance with ASTM D2240.

To form the encapsulant 200 from the encapsulating material and in accordance with any of the embodiments above, in one exemplary method of the present invention, after the glass frame 30 is installed within the respective plastic frame 100, the installed glass frame and plastic frame 100 are placed into a mold (not shown), such an injection mold, wherein an encapsulant 200 is molded onto one or both of the first side 32 and second side 34 of the glass panel 30 and onto the outer surface of the plastic frame 100 to sealingly secure the plastic frame 100 to the glass panel 30. The encapsulant 200 is formed by introducing the encapsulating material, as described above, in a flowable or liquid form and at a desired pressure within the cavity portion of the mold and onto the at least one of the first side and the second side of the glass panel and onto the outer surface of the plastic frame 100. To ensure that the encapsulating material (which is non-flowable and/or non-liquid at temperatures such as room temperature or ambient temperature and also at temperatures typically experienced by vehicles to which it is coupled during operating conditions) is in a flowable or a liquid form for introduction into the cavity of the mold, the encapsulating material is first heated to a flowable temperature sufficient to wherein the encapsulating material is in flowable and/or a liquid form. The desired pressure is sufficient to allow the encapsulating material to fill the cavity portion of the mold and contact the portions of the glass panel 30 and plastic frame 100 for bonding as desired but insufficient to cause premature opening of the mold and flash. Once the encapsulating material is cooled to harden the encapsulating material from its liquid or its flowable form to a non-liquid (i.e., solid) or non-flowable form to form the encapsulant 200, the encapsulated glass assembly 25 may be removed from the mold. In most plastics used as the encapsulating material herein, the flowable temperature of the encapsulating material corresponds to a temperature greater than its glass transition temperature, and thus the encapsulating material is introduced at a temperature above its glass transition temperature to fill the cavity, and subsequently cooled to a temperature below its glass transition temperature to form the encapsulant 200.

Optionally, the encapsulant 200 may be formed in a single step or in multiple steps in associated exemplary methods for application of the present invention. For example, a first encapsulating material may be applied to a first portion of the respective frame 100 and to one of the first side 32 or second side 34 the glass panel 30, and a second encapsulating material 200 may be applied to another portion of the respective frame 100 and to other one of the first side 32 or second side 34 of the glass panel. In further embodiments, the first and second encapsulating material may be integrally formed, while in further embodiments the first and second encapsulating material may form separate encapsulants 200 for the encapsulated glass assembly 25, but wherein the first and second encapsulating materials form a single integral encapsulant 200. In certain embodiments, the first encapsulating material and the second encapsulating material, when separately applied, are formed from the same polymeric material. In yet further embodiments, the first encapsulating material and second encapsulating material are formed from different polymeric materials.

The temperatures and pressures used to form the encapsulant 200 within the mold, and in particular within the injection mold in accordance with one exemplary method of application, are dependent upon numerous factors, including but not limited to the type of encapsulating material used, the type of characteristics of the molding equipment used (including mold temperature, melt temperature, nozzle temperature, zone temperatures, and feed temperatures), and to a lesser extent the desired shape and thickness of the encapsulant 200 applied onto the glass frame 100 and glass panel 30. Notably, because the encapsulating material used to form the encapsulant 200 as described above may be molded at relatively low pressures and temperatures within the mold, such as the injection mold described above, the risk of cracking or breaking the glass panel 30 during the molding process is minimized or prevented.

Exemplary injection molding equipment having these molding characteristics that may be used in the exemplary application methods of the present invention include, but are not limited, those sold commercially from Krauss-Maffei Corporation of Munich, Germany (described above with respect to molding the plastic frame 100).

When TPEs such as SBS or SEBS are utilized as the encapsulating material (i.e., the encapsulating material is a TPE-based encapsulating material such as SBS or SEBS) and the material is injection molded onto the glass panel using conventional injection molding equipment (such as those sold commercially from Krauss-Maffei Corporation), in one exemplary method of the present invention, the molding conditions are as follows: mold temperatures ranging from about 100 to 130 degrees Fahrenheit (about 38 to 55 degrees Celsius); injection pressures ranging from about 3000 to 4500 pounds per square inch (about 2.07 to 3.10 MPa (MegaPascals)); barrel temperatures ranging from about 400 to 430 degrees Fahrenheit (about 204 to 221 degrees Celsius), and fill times ranging from 2.1 to 2.6 seconds.

Notably, these injection pressures are generally lower than the corresponding injection pressures, at corresponding or lower barrel temperatures and at slower fill times, as compared with molding conditions required to mold polypropylene encapsulants onto glass as described above. Improvement in any one of the factors (lower injection pressure; lower molding and barrel temperatures; and increased fill times) much less a combination of any two or more of these factors, is believed to decrease the risk of glass panel 30 breakage during the molding process.

After cooling, the mold is released, and the encapsulated glass assembly 25 is formed that includes the glass panel 30, plastic frame 100, and the encapsulant 200.

The present invention thus provides simplified glass assemblies having high strength and a simplified manufacturing process. In addition, the coupling of the plastic frame and encapsulant to the glass panel in accordance with the present invention forms glass assemblies with high strength that cannot be achieved using the one-shot or two-shot encapsulation techniques that form softer enclosures. Still further, the application of the encapsulating material to form an encapsulant onto the glass panel and frame to secure the glass panel to the frame in accordance with the present invention may be done at lower temperatures and pressures than required to bond high hardness plastic materials such as polypropylene to the glass panel as the encapsulant, thus minimizing or preventing the breakage of the glass panels during the application process. Accordingly, the present invention allows the use of lower strength and better acoustical glass panels, such as laminated glass panels, in this manufacturing process.

The present invention has been described herein in an illustrative manner. It is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. An encapsulated glass assembly comprising:
   a laminated glass panel having a first side and a second side and an edge between said first side and said second side;
   a plastic frame coupled to said laminated glass panel, said plastic frame having at least three sides and having a corner located between each adjacent side and including an outer frame surface, said outer frame surface including a channel extending within said outer frame surface,
      wherein said channel has a lower wall portion connected to a side wall portion,
      wherein said outer frame surface further includes at least one upper wall portion extending from said side wall portion and extending along at least one side of said at least three sides of said plastic frame, each one of said at least one upper wall portions spaced from said lower wall portion and further defining a portion of said channel as a C-shaped channel, and
      wherein said laminated glass panel is coupled to said plastic frame such that said laminated glass panel is retained within said C-shaped channel and such that said edge of said laminated glass panel is adjacent to said side wall portion along each of said at least three sides and said corners of said plastic frame; and
   an encapsulant bonded to at least one of said first side and said second side of said laminated glass panel and bonded onto said outer frame surface of said plastic frame to secure said laminated glass panel to said plastic frame, said encapsulant having a Shore hardness less than a Shore hardness of said plastic frame,
      wherein said side wall portion of said plastic frame is disposed between said edge of said laminated glass panel and said encapsulant.

2. The encapsulated glass assembly according to claim 1, wherein said at least one upper wall portion comprises a single upper wall portion that is connected to and extending from an entire upper length of said side wall portion.

3. The encapsulated glass assembly according to claim 1, wherein said at least one upper wall portion comprises a single upper wall portion that is connected to and extending from less than an entire upper length of said side wall portion.

4. The encapsulated glass assembly according to claim 1, wherein said at least one upper wall portion comprises a plurality of upper wall portions, wherein each one of said plurality of upper wall portions is spaced from an adjacent one of said plurality of upper wall portions along an upper length of said side wall portion.

5. The encapsulated glass assembly according to claim 1, wherein an outer edge of an inner surface of one of said at least one upper wall portions is in resilient contact with said first side of said laminated glass panel.

6. The encapsulated glass assembly according to claim 1, wherein said at least one upper wall portion is integrally formed with said side wall portion and said lower wall portion.

7. The encapsulated glass assembly according to claim 1, wherein at least one of said at least one upper wall portions comprises a clamping device separately formed from said plastic frame and positioned adjacent to said side wall portion, wherein said clamping device is secured to said side wall portion with a fastening device.

8. The encapsulated glass assembly according to claim 1, wherein said encapsulant is bonded to each of said first side and said second side of said laminated glass panel.

9. A vehicle including the encapsulated glass assembly according to claim 1.

10. An encapsulated glass assembly comprising:
    a glass panel having a first side and a second side and an edge between said first side and said second side, wherein said glass panel comprises a laminated glass panel or a tempered glass panel;
    a plastic frame coupled to said glass panel, said plastic frame having at least three sides and having a corner located between each adjacent side and including an outer frame surface, said outer frame surface including a channel extending within said outer frame surface,
       wherein said channel has a lower wall portion connected to a side wall portion,
       wherein said outer frame surface further includes at least one upper wall portion extending from said side wall portion and extending along at least one side of said at least three sides of said plastic frame, each one of said at least one upper wall portions spaced from said lower wall portion and further defining a portion of said channel as a C-shaped channel, wherein said at least one upper wall portion is connected to and extending from less than an entire upper length of said side wall portion; and
       wherein said glass panel is coupled to said plastic frame such that the glass panel is retained within said C-shaped channel and such that said edge of said glass panel is adjacent to said side wall portion along each of said at least three sides and said corners of said plastic frame; and
    an encapsulant bonded to at least one of said first side and said second side of said glass panel and bonded onto said outer frame surface of said plastic frame to secure said glass panel to said plastic frame, said encapsulant having a Shore hardness less than a Shore hardness of said plastic frame,
       wherein said side wall portion of said plastic frame is disposed between said edge of said laminated glass panel and said encapsulant.

11. The encapsulated glass assembly according to claim 10, wherein said at least one upper wall portion comprises a single upper wall portion that is connected to and extending from less than an entire upper length of said side wall portion.

12. The encapsulated glass assembly according to claim 10, wherein said at least one upper wall portion comprises a plurality of upper wall portions, wherein each one of said plurality of upper wall portions is spaced from an adjacent one of said plurality of upper wall portions along an upper length of said side wall portion.

13. The encapsulated glass assembly according to claim 10, wherein an outer edge of an inner surface of one of said at least one upper wall portion is in resilient contact with said first side of said glass panel.

14. The encapsulated glass assembly according to claim 10, wherein said at least one upper wall portion is integrally formed with said side wall portion and said lower wall portion.

15. The encapsulated glass assembly according to claim 10, wherein at least one of said at least one upper wall portion comprises a clamping device separately formed from said plastic frame and positioned adjacent to said side wall portion, wherein said clamping device is secured to said side wall portion with a fastening device.

16. The encapsulated glass assembly according to claim 10, wherein said encapsulant is bonded to each of said first side and said second side of said glass panel.

17. A vehicle including the encapsulated glass assembly according to claim 10.

18. A method for forming an encapsulated glass assembly including a glass panel comprising a laminated glass panel or a tempered glass panel and having a first side and a second side and an edge for connecting the first side to the second side, said method comprising:
- forming a plastic frame having at least three sides and having a corner located between each adjacent side and including an outer frame surface, the outer frame surface including a channel extending within the outer frame surface, the channel including a lower wall portion connected to a side wall portion, wherein the outer frame surface further includes at least one upper wall portion extending from the side wall portion and extending along at least one side of the plastic frame, each one of the at least one upper wall portions spaced from the lower wall portion and further defining a portion of the channel as a C-shaped channel;
- coupling the glass panel to the plastic frame such that the glass panel is retained within the C-shaped channel and such that the edge of the glass panel is adjacent to the side wall portion along each of the at least three sides and the corners of the plastic frame;
- introducing an encapsulating material in a flowable form or in a liquid form onto the at least one of the first side and the second side of the glass panel and onto the outer frame surface of the plastic frame; and
- cooling the encapsulating material to harden the encapsulating material to form an encapsulant to secure the glass panel to the plastic frame, the encapsulant bonded to the at least one of the first side and the second side of the glass panel and bonded onto the outer frame surface of the plastic frame, the encapsulant having a Shore hardness less than a Shore hardness of the plastic frame,
- wherein the side wall portion of the plastic frame is disposed between the edge of the glass panel and the encapsulant.

19. The method according to claim 18, wherein the step of coupling glass panel to the plastic frame comprises:
- pressing the second side of the glass panel against an outer surface of each one of the at least one upper wall portion in a direction towards the lower wall portion such that an outer edge of an inner surface of each one of the at least one upper wall portions is displaced in a direction towards the side wall portion;
- wherein the displacement of the outer edge of each one of the at least one upper wall portion towards the side wall portion allows the edge of the glass panel of the glass panel to clear the outer edge of each respective one of the at least one upper wall portion to allow the second side of the glass panel to move to a position adjacent to the lower wall portion, wherein the placement of the second side of the glass panel adjacent to the lower wall portion allows the outer edge of each one of the plurality of upper wall portions to move in a direction away from the side wall portion such that the edge of the glass panel is adjacent to the lower wall portion and such that the glass panel is retained within the C-shaped channel.

20. The method according to claim 18, wherein at least one of the at least one upper wall portion comprises a clamping device, and wherein the method further comprises
- coupling the clamping device in a position adjacent to the side wall portion and spaced from the lower wall portion of the plastic frame prior to or after the step of coupling the glass panel to the plastic frame, and
- securing the clamping device to the side wall portion with a fastening device.

21. An encapsulated glass assembly formed in accordance with the method of claim 18.

* * * * *